(12) United States Patent
Funahashi et al.

(10) Patent No.: US 6,339,049 B1
(45) Date of Patent: Jan. 15, 2002

(54) GREASE COMPOSITIONS AND BEARINGS SEALED THEREWITH

(75) Inventors: Hiroshi Funahashi, Tokyo; Yoshio Taki, Yamanashi-ken; Yoshiyuki Honjo, Tokyo; Tomonori Kaneko, Yamanashi-ken; Hirotugu Kinoshita; Kiyomi Sakamoto, both of Kanagawa-ken, all of (JP)

(73) Assignees: THK Co., Ltd.; Nippon Mitsubushi Oil Corporation, both of Tokyo (JP)

( * ) Notice: Subject to any disclaimer, the term of this patent is extended or adjusted under 35 U.S.C. 154(b) by 0 days.

(21) Appl. No.: 09/708,051

(22) Filed: Nov. 8, 2000

(30) Foreign Application Priority Data

Nov. 10, 1999 (JP) ............................................ 11-319538

(51) Int. Cl.$^7$ ............................................ C10M 137/00
(52) U.S. Cl. ........................ 508/100; 508/320; 508/441
(58) Field of Search .............................. 508/100, 320, 508/441

(56) References Cited

U.S. PATENT DOCUMENTS

| | | | | |
|---|---|---|---|---|
| 2,258,301 A | * | 10/1941 | Morway et al. | 508/320 |
| 2,428,340 A | * | 9/1947 | Ruedrich | 508/320 |
| 2,625,510 A | * | 1/1953 | Moore | 508/320 |
| 3,355,384 A | * | 11/1967 | Scott | 508/320 |
| 5,043,085 A | * | 8/1991 | Kinoshita et al. | 508/320 |
| 5,714,444 A | * | 2/1998 | Yokouchi et al. | 508/539 |
| 5,854,183 A | * | 12/1998 | Hasegawa et al. | 508/316 |
| 5,910,470 A | * | 6/1999 | Minami et al. | 508/320 |

FOREIGN PATENT DOCUMENTS

| | | |
|---|---|---|
| JP | 6-025688 | 2/1994 |

OTHER PUBLICATIONS

English language abstract of Japanese Publication No. JP–A–05–009489.
English language abstract of Japanese Publication No. JP–A–08–143884.
English language abstract of Japanese Publication No. JP–A–08–270747.
English language abstract of Japanese Publication No. JP–A–09–217745.

* cited by examiner

*Primary Examiner*—Jacqueline V. Howard
(74) *Attorney, Agent, or Firm*—Arent Fox Kintner Plotkin & Kahn

(57) ABSTRACT

This invention relates to grease compositions containing mineral oil and/or synthetic oil as base oil, (A) lithium stearate as thickener, and (B) one kind or two kinds of more of compounds selected from a group of oxidized paraffins and diphenyl hydrogenphosphite and displaying a worked penetration in the range 270–350 and also to bearings such a s linear guides, ball screws, and rolling bearings sealed with said grease compositions.

This invention can provide grease compositions of low dust emission which perform with an excellent balance of low dust emission, low rolling characteristics and fretting resistance, extend the lubricating period, reduce the maintenance cost, and are suitable for use in a clean environment. This invention can also provide bearings sealed with said grease compositions of low dust emission suitable for use in a clean environment such as semiconductor manufacturing equipment, liquid crystal manufacturing equipment, and electronic computers.

3 Claims, 2 Drawing Sheets

GREASE COMPOSITIONS AND BEARINGS SEALED THEREWITH

FIELD OF THE INVENTION AND RELATED ART STATEMENT

This invention relates to grease compositions which are used to give lubricity to bearings, sliding parts, and junctions of a variety of equipment, and particularly to grease compositions of low dust emission which are suitable for use in bearings such as linear guides, ball screws, and rolling bearings of semiconductor manufacturing equipment, liquid crystal manufacturing equipment, electronic computers, and the like that require a clean working environment and also to bearings sealed with said grease compositions.

In regard to those grease compositions which are used in bearings such as linear guides, ball bearings, and rolling bearings to be incorporated into equipment that require a clean working environment such as semiconductor manufacturing equipment, liquid crystal manufacturing equipment, and electronic computers, the property of low dust emission is extremely important because the product value would be lost or erroneous functioning would be caused if grease becomes airborne and adheres to wafers and recording media.

Up to the present, fluorine greases of extremely low volatility composed of perfluoropolyether (PFPE) as base oil and polytetrafluoroethylene (PTFE) as thickener have generally been used in the aforementioned bearings that require a clean working environment. However, the fluorine greases have high rolling resistance because of the use of high-viscosity PFPE as base oil and become the cause of heat generation and overloaded motor. Moreover, there is a problem of the fluorine greases being inferior to greases based on mineral oil or synthetic oil in wear resistance.

To solve the aforementioned problems, several grease compositions of low dust emission have been proposed.

For example, a variety of grease compositions have been formulated from mineral oil, synthetic hydrocarbon oil, ether oil, or ester oil of a specified kinematic viscosity as base oil and metallic soap such as lithium salt of $C_{12}$–$C_{24}$ higher fatty acids and higher hydroxyfatty acids or a urea compound such as diurea as thickener at a specified ratio, thereby increasing the hardness of grease to have the property of low dust emission and at the same time reducing the rolling resistance as described in the specifications of Japan Kokai Tokkyo Koho Hei 5-9489 (1993), Japan Kokai Tokkyo Koho Hei 8-143884 (1996), Japan Kokai Tokkyo Koho Hei 8-270747 (1996), and Japan Kokai Tokkyo Koho Hei 9-217745 (1997).

In addition to the property of low dust emission, however, grease compositions for use in bearings such as linear guides, ball screws, and rolling bearings intended for semiconductor manufacturing equipment, liquid crystal manufacturing equipment, and electronic computers are required to have not merely low rolling resistance but also a narrow range of variation in rolling resistance because the precision positioning unit of a bearing is required to function with uniform velocity during low-speed operation and with rapid follow-up during microstep feeding (both low rolling resistance and small variation in rolling resistance are sometimes referred to as "low rolling characteristics" hereinafter). Furthermore, the grease compositions are required to perform well in fretting wear resistance as microvibration generated by microfeeding at the time of use causes fretting wear.

Hardening grease in order to reduce dust emission decreases the fretting resistance and increases the resistance of grease, thus adversely affecting the low rolling characteristics. Conversely, softening grease in order to improve the fretting resistance and low rolling characteristics makes it impossible to attain the desired level of low dust emission.

No grease compositions with a good balance of low dust emission, low rolling characteristics and fretting resistance have been known thus far and what is practiced at the present time is to apply grease compositions at the sacrifice of some of the properties depending upon the end use.

OBJECT AND SUMMARY OF THE INVENTION

The present inventors have conducted intensive studies to develop grease compositions with a balanced performance with respect to low dust emission, low rolling characteristics, and fretting resistance, found that the incorporation of using lithium stearate as thickener, controlling the hardness of grease in terms of worked penetration (JIS K2220 5.3) in the relatively soft range 270–350 and using one kind or two kinds or more of compounds selected from a group of oxidized paraffins and diphenyl hydrogenphosphite in specified amounts can help to display a well-balanced performance of low dust emission, low rolling characteristics, and fretting resistance, thereby extending the lubricating period and reducing the maintenance cost, and completed this invention.

Accordingly, an object of this invention is to provide grease compositions of low dust emission which have a balanced performance in respect to low dust emission, low rolling characteristics, and fretting resistance, can extend the lubricating period, reduce the maintenance cost, and are suitable for use in a clean environment.

Another object of this invention is to provide bearings of low dust emission which are sealed with said grease compositions of low dust emission and are suitable for use in a clean environment such as semiconductor manufacturing equipment, liquid crystal manufacturing equipment, and electronic computers.

Thus, this invention relates to grease compositions which contain 10–35 mass % of (A) lithium stearate as thickener and 0.5–15.0 mass % of (B) one kind or two kinds or more of compounds selected from a group of oxidized paraffins and diphenyl hydrogenphosphite and display a worked penetration in the range 270–350.

This invention also relates to bearings which are sealed with said grease compositions.

This invention will be described in detail below.

Lubricating base oils to be used in this invention include mineral oils and/or synthetic oils. The kinematic viscosity of these base oils at 100° C. is normally 2 mm²/sec., preferably 3 mm²/sec., at its lower limit and it is normally 40 mm²/sec., preferably 30 mm²/sec., at its upper limit. The viscosity index of the base oils is normally 90 or more, preferably 95 or more.

Mineral oil is obtained by a procedure generally practiced in the process for producing lubricating oils in petroleum refining. A lubricating oil fraction obtained by atmospheric distillation or vacuum distillation of crude oil is refined by subjecting it to one or more treatments such as solvent deasphalting, solvent extraction, hydrocracking, solvent dewaxing, catalytic dewaxing, hydrorefining, sulfuric acid washing, and clay treatment.

Synthetic oils include polybutenes, poly-α-olefins such as 1-octene oligomers, and 1-decene oligomers and their hydrogenated products, diesters such as ditridecyl glutarate, di(2-ethylhexyl) adipate, diisodecyl adipate, ditridecyl adipate, and di(3-ethylhexyl) sebacate, polyol esters such as trimethylolpropane caprylate, trimethylolpropane pelargonate, pentaerythritol 2-ethylhexanoate, and pentaerythritol pelargonate, alkylnaphthalenes, alkylbenzenes, polyoxyalkylene glycols, polyphenyl ethers, dialkyl diphenyl ethers, silicone oils, and mixtures of these compounds.

As a lubricating base oil of this invention, one kind of the aforementioned mineral oils and/or synthetic oils can be used singly or a mixture of two or more kinds can also be used.

Lithium stearate to be used as component A in this invention means either lithium stearate or lithium salts of a mixture of fatty acids consisting mainly of stearic acid. These lithium salts can be obtained generally by the reaction of stearic acid or a mixture of fatty acids consisting mainly of stearic acid with lithium hydroxide. Also, a mixture of fatty acids consisting mainly of stearic acid can be obtained by hydrolyzing natural oils and fats and, for example, directly separated fatty acids and hardened fatty acids obtained from beef tallow are desirable raw materials for lithium stearate.

The aforementioned directly separated fatty acids refer to a mixture of fatty acids obtained by directly decomposing beef tallow and they usually contain oleic acid in the range 30–60 mass %, stearic acid in the range 20–60 mass %, and additionally lauric acid, myristic acid, palmitic acid, and other unsaturated fatty acids in small amounts. The aforementioned hardened fatty acids refer to a mixture of fatty acids obtained by either decomposing a hardened oil resulting from the hydrogenation of beef tallow or hydrogenating the aforementioned directly separated fatty acids and they generally contain 60 mass % or more of stearic acid and additionally other saturated fatty acids such as lauric acid, myristic acid, and palmitic acid in small amounts.

On the basis of the whole grease composition, the proportion of component A is 10 mass %, preferably 15 mass %, at its lower limit and 35 mass %, preferably 27 mass %, at its upper limit. The grease softens too much to maintain the property of low dust emission if the proportion of component A is less than 10 mass % whereas the grease hardens to such an extent as to deteriorate the fretting resistance and low rolling characteristics if the proportion of component A is more than 35 mass %.

One kind or two kinds or more of compounds selected from a group of oxidized paraffins and diphenyl hydrogenphosphite are used as component B in this invention. Oxidized paraffins here refer to the products obtained by oxidizing petroleum-derived waxes such as paraffin wax and microcrystalline wax or synthetic waxes such as polyethylene wax. The properties of oxidized paraffins to be used in this invention are arbitrary; however, from the standpoint of fretting resistance, it is desirable to use oxidized paraffins whose melting point is 25° C., preferably 30° C., at its lower limit and 110° C., preferably 70° C., at its upper limit and whose total acid value is 0.2 mg KOH/g, preferably 1 mg KOH/g, at its lower limit and 165 mg KOH/g, preferably 40 mg KOH/g, at its upper limit.

On the other hand, diphenyl hydrogenphosphite is a compound represented by the following formula (1).

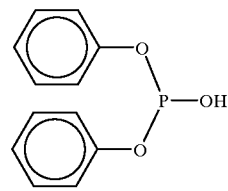

(1)

The proportion of this component B is 0.5 mass %, preferably 1.0 mass %, at its lower limit and 15 mass %, preferably 10 mass %, at its upper limit. The grease does not display sufficient fretting resistance with less than 0.5 mass % of component B while the grease does not display enhanced fretting resistance corresponding to the added amount with more than 15 mass % of component B.

The worked penetration of grease compositions of this invention is 270, preferably 290, at its lower limit and 350, preferably 330, at its upper limit. In case the worked penetration is lower than 270, the grease hardens and does not have the desired performance in fretting resistance and, besides, the grease offers increased resistance and does not have sufficiently low rolling characteristics. On the other hand, in case the worked penetration is higher than 350, the grease softens too much to attain the desired property of low dust emission. The worked penetration in this invention refers to the value determined in accordance with JIS K2220-1993 "Lubricating Grease, 5.3.3 Test Method for Worked Penetration."

It is desirable for grease compositions of this invention to satisfy the requirement for low dust emission described below. The test for dust emission is conducted by sealing a linear guide [SR20W1+280lP, available from THK Co., Ltd.] with 1 cm³ of grease, running the guide in an acrylic case at a feeding speed of 30 m/min and a stroke of 200 mm for 15 hours, and measuring the amount of dust at an air supply of 500 cm³/min with a particle counter for particles with a diameter of 0.3 μm or more (Model KC-01D, available from RION). The amount is hopefully 500 particles/2 min·l or less, preferably 300 particles/2 min·l or less, more preferably 500 particles/2 min·l or less.

Furthermore, it is desirable for grease compositions of this invention to satisfy the requirement for low rolling characteristics described below. When the test for rolling resistance is conducted in a microstroke mode by sealing a linear guide [HSR35RCO+440LP, available from THK Co., Ltd.] with 4 cm³ of grease (with initial sealing only) and running the guide at a feeding speed of 1 mm/sec and a stroke of 3 mm for 60 minutes, the rolling resistance desirably varies in a range with the width of 10.0N or less, preferably 5.0N or less. When the test for the resistance of grease is conducted by sealing a linear guide [HSR25A1C1+580LP, available from THK Co., Ltd.] with 3 cm³ of grease (with initial sealing only) and running the guide at a feeding speed of 10 mm/sec and a stroke of 200 mm, the difference in rolling resistance before and after sealing with the grease is 5.0N or less, preferably 2.0N or less.

Still more, it is desirable for grease compositions of this invention to satisfy the requirement for fretting resistance described below. A linear guide [HSR35R2UUCS+440LP-II, available from THK Co., Ltd.] is sealed with 4 cm³ of grease (with initial sealing only) and the fretting test is conducted at an oscillation frequency of 200 opm (3.33 Hz), a load of 9.8 kN, and a stroke of 3 mm for 10 hours. The condition of dust particles generated by oxidative abrasion on the surface of the rail on which the balls roll is observed and at the same time the abrasion of the surface is measured by a surface roughness tester. The extent of generation of particles by oxidative abrasion is desirably small and its magnitude is 5 μm or less, preferably 4 μm or less, more preferably 3 μm or less.

What is desirable all in all is that grease compositions of this invention have a good balance of the aforementioned properties of low dust emission, low rolling characteristics, and fretting resistance. A good balance of properties here means that the grease compositions have all of the aforementioned desirable properties simultaneously.

In order to improve still further the performance properties of grease compositions of this invention, it is allowable to add, if necessary, extreme pressure agents, antioxidants, oiliness improvers, rust inhibitors, viscosity index improvers, and the like to the compositions to the extent that the properties are not adversely affected.

Useful as extreme pressure agents here are, for example, organic zinc compounds such as zinc dialkyldithiophosphates, zinc diaryldithiophosphates, and zinc dialkyldithiocarbamates, organic molybdenum compounds such as molybdenum dialkyldithiophosphates, molybdenum diaryldithiophosphates, and molybdenum diaryldithiocarbamates, thiocarbamyl compounds, phosphates, and phosphites.

The antioxidants here include phenols such as 2,6-di-t-butylphenol and 2,6-di-t-butyl-p-cresol, amines such as dialkyldiphenylamines, phenyl-α-naphthylamine and p-alkylphenyl-α-naphthylamines, sulfur compounds, and phenothiazines.

The oiliness agents include amines such as laurylamine, myristylamine, palmitylamine, stearylamine, and oleylamine, higher alcohols such as lauryl alcohol, myristyl alcohol, palmityl alcohol, stearyl alcohol, and oleyl alcohol, higher fatty acids such as lauric acid, myristic acid, palmitic acid, stearic acid, and oleic acid, fatty acid esters such as methyl laurate, methyl myristate, methyl palmitate, methyl stearate, and methyl oleate, amides such as laurylamide, myristylamide, palmitylamide, stearylamide, and oleylamide, and oils and fats.

The rust inhibitors include metal soaps, partial esters of polyhydric alcohols such as sorbitan fatty acid esters, amines, phosphoric acid, and phosphates. The viscosity index improvers include polymethacrylates, polyisobutylenes, and polystyrenes.

This invention provides a variety of bearings sealed with the aforementioned grease compositions. Concrete examples of such bearings are linear guides, ball screws, and rolling bearings incorporated into semiconductor manufacturing equipment, liquid crystal manufacturing equipment, and electronic computers. There is no specific restriction to the procedure and tools for sealing these bearings with grease compositions of this invention and the conventional procedure is applicable.

A typical procedure is explained below for a linear guide with a ball bearing for linear sliding as an example.

As illustrated in FIG. 1, a ball bearing for linear sliding is composed of a rail 1, a sliding block 2 which slides along the rail 1, and a ball 3 which runs rolling under a load between the rail 1 and the sliding block 2. A ball-rolling surface 4 is formed on the rail 1 and, coupled with the ball-rolling surface 4 on the rail 1, a loaded ball-rolling surface 5 which forms a loaded ball-rolling route 6 is formed on the sliding block 2. At the same time, a nonloaded ball-rolling route 7 is formed along which the ball 3 circulates from one end of the loaded ball-rolling route 6 to the other end. A space formed between the aforementioned rail 1 and the sliding block 2 is sealed by a sealing component 8 whose base is attached to the sliding block 2 and whose tip is in sliding contact with the rail 1 to form a sealed space 9. A grease nipple 10 leading to the aforementioned sealed space 9 is provided on the sliding block 2.

This ball bearing for linear sliding is sealed with grease, for example, by filling a grease gun with grease and introducing the grease through the grease nipple 10 to the sealed space 9 formed between the rail 1 and the sliding block 2.

Grease compositions and bearings of this invention can perform with an excellent balance of low dust emission, low rolling characteristics, and fretting resistance by adding specified amounts of (A) lithium stearate as thickener and (B) one kind or two kinds or more of compounds selected from a group of oxidized paraffins and diphenyl hydrogenphosphite to mineral oil and/or synthetic oil as base oil and setting the worked penetration in the range 270–350.

Grease compositions of low dust emission of this invention perform with an excellent balance of low dust emission, low rolling characteristics, and fretting resistance and they can extend the lubricating period and reduce the maintenance cost and are suitable for use in a clean environment.

For this reason, bearings such as linear guides, ball screws, and rolling bearings sealed with grease compositions of low dust emission of this invention are suitable for use in a clean environment such as semiconductor manufacturing equipment, liquid crysal manufacturing equipment, and electronic computers.

DETAILED DESCRIPTION OF THE PREFERRED EMBODIMENTS

A preferred mode of practicing this invention will be described concretely below with reference to examples and comparative examples.

The following three kinds of compounds were used as lubricating base oil in the examples and comparative examples.

①Dialkyldiphenyl ether (DADPE) represented by the following formula (2)

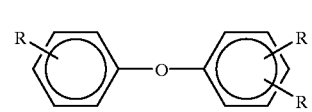

(2)

(wherein R is a hydrogen atom or an alkyl group with 12–14 carbon atoms and one of three R's is a hydrogen atom and the remaining two are alkyl groups, either identical with or different from each other) and displaying a kinematic viscosity of 12 mm²/sec at 100° C.

② Mineral oil displaying a kinematic viscosity of 15 mm²/sec at 100° C. and a viscosity index of 98.

③ A mixture of hydrogenated 1-decene oligomers (PAO) represented by the following formula (3)

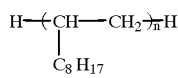

(3)

(wherein n is an integer in the range 3–5).

EXAMPLES 1–5 AND COMPARATIVE EXAMPLES 1–6

In Examples 1 to 5 and Comparative Examples 2 and 3, stearic acid was added to the base oil prepared from the aforementioned.to.as shown in Table 1, the mixture was heated until a solution was obtained, an aqueous solution which had been prepared by dissolving lithium hydroxide in water under heat was added, and the mixture was heated with stirring to evaporate the water. The remainder was heated further until the reaction mixture dissolved, then the base oil was added to form a gel-like substance, the gel-like substance was cooled with stirring, component B (oxidized paraffin displaying a melting point of 40° C. and a total acid value of 30 mg KOH/g or diphenyl hydrogenphosphite) and the amine-based rust inhibitor shown in Table 1 were added, and the mixture was passed through a roll mill to give a grease composition.

The same procedure as above was followed in Comparative Example 1 with the exception of using 12-hydroxystearic acid in place of stearic acid to give a grease composition.

In Comparative Examples 4 to 6, diphenylmethane-4,4'-diisocyanate was added to the lubricating base oil, the mixture was heated until a solution was obtained, a solution of cyclohexylamine in the lubricating base oil which had been prepared under heat was added to form a gel-like substance, component B and the antioxidant shown in Table 1 were added to the gel-like substance, and the mixture was passed through a roll mill to give a grease composition.

The grease compositions thus prepared in Examples 1 to 5 and Comparative Examples 1 to 6 were respectively tested for the worked penetration at 25° C. and 60W in accordance with JIS K2220 5.3 and also for dust generation, rolling characteristics, and fretting resistance in accordance with the aforementioned test methods (for dust generation, rolling resistance in a microstroke mode, resistance of grease, and fretting resistance) with the use of a linear guide.

Table 1 shows the results for Examples 1 to 5 and Comparative Examples 1 to 6.

Figure 1:
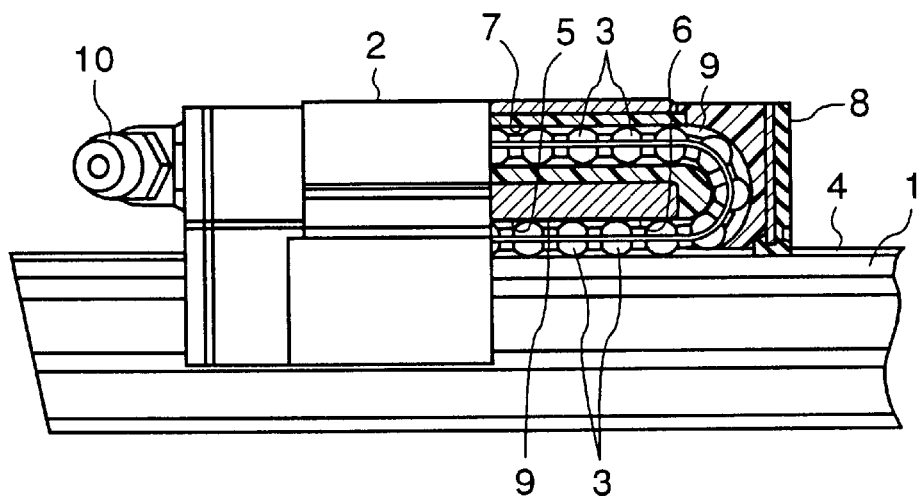
FIG. 1 is a cross section of a ball bearing for linear sliding illustrating an example of a bearing sealed with a grease composition of low dust emission of this invention.
Figure 2:
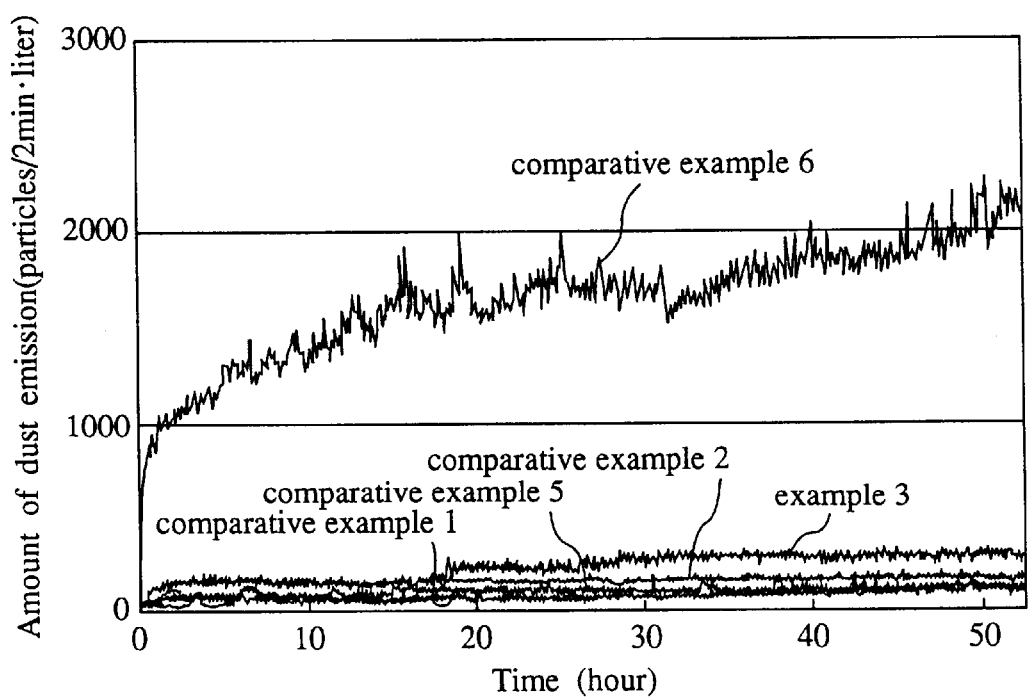
FIG. 2 is a graph showing the results of the dust-generating test conducted on the grease compositions of Example 3 and Comparative Examples 1, 2, 5 and 6.
Figure 3:
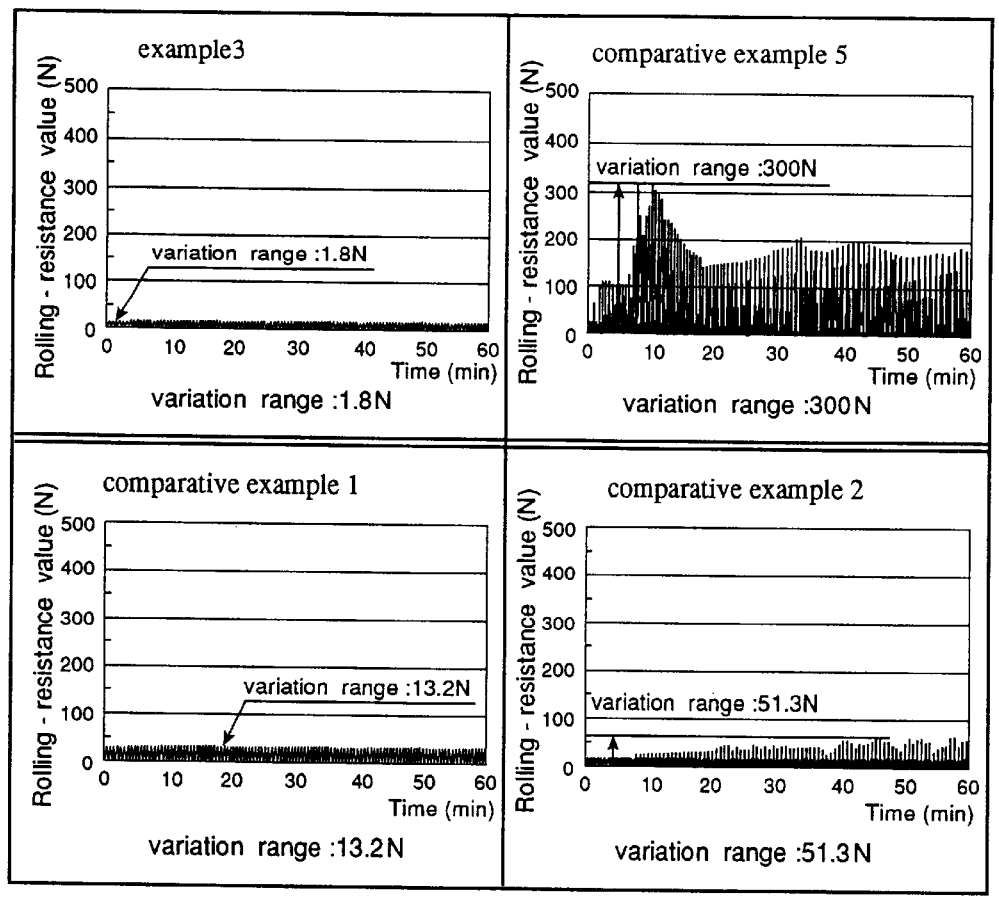
FIG. 3 is a graph showing the results of the test for rolling resistance in a microstroke mode of the grease compositions of Example 3 and Comparative Examples 1, 2, and 5.
Figure 4:
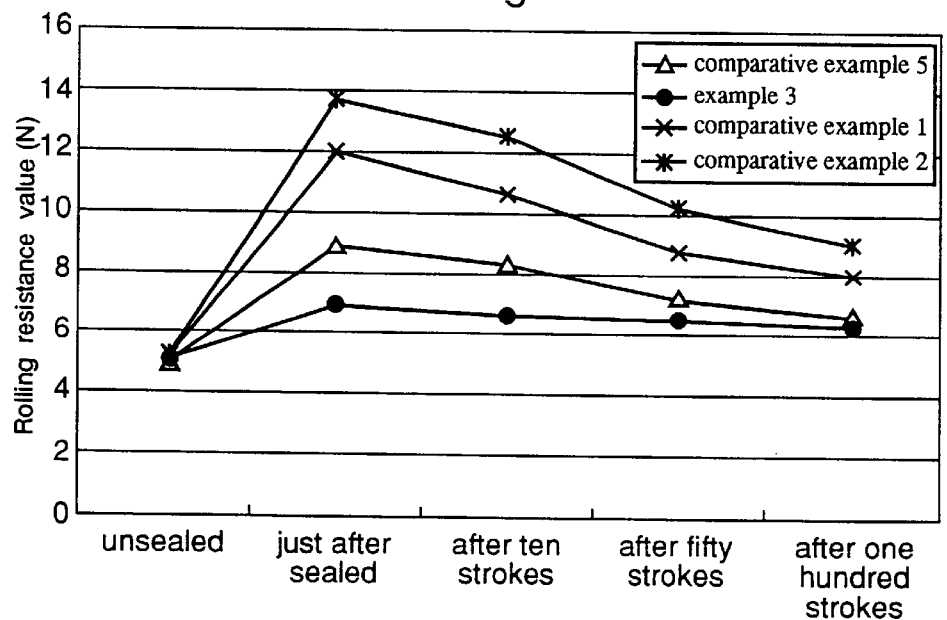
FIG. 4 is a graph showing the results of the test for resistance of grease of the grease compositions of Example 3 and Comparative Examples 1, 2, and 5.

The results of the test for dust generation in Example 3 and Comparative Examples 1, 2, 5 and 6 and the results of the tests for rolling resistance in a microstroke mode and resistance of grease in Example 3 and Comparative Examples 1, 2 and 5 are respectively shown in FIGS. 2 to 4.

TABLE 1

|  | Example | | | | | Comparative example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Composition of grease (mass %) | | | | | | | | | | | |
| Lubricating base oil | | | | | | | | | | | |
| DADPE | 72 | 76 | 76.5 | 49.5 | — | 87 | 69 | — | — | 38.5 | — |
| Mineral Oil | — | — | — | — | 35 | — | — | 78 | — | 38.5 | 77 |
| PAO | — | — | — | 21.5 | 35 | — | — | — | 76 | — | — |
| Component A | | | | | | | | | | | |
| Lithium stearate | 23 | 20 | 20 | 22 | 21 | — | 27 | 20 | — | — | — |
| Lithium 12-hydroxystearate | — | — | — | — | — | 8 | — | — | — | — | — |
| Diphenylmethane-4,4'-diisocyanate | — | — | — | — | — | — | — | — | 10 | 11.8 | 10 |
| Cyclohexylamine | — | — | — | — | — | — | — | — | 8 | 9.2 | 8 |
| Component B | | | | | | | | | | | |
| Oxidized paraffins | 3 | — | 2 | 4 | 5 | 3 | — | — | 3 | — | 2 |
| Diphenyl hydrogenphosphite | — | 2 | 0.5 | 1 | 2 | — | 2 | — | 1 | — | 1 |
| Amine-based antioxidant | 2 | 2 | 2 | 2 | 2 | 2 | 2 | 2 | 2 | 2 | 2 |
| Property | | | | | | | | | | | |
| Worked penetration (25° C.) | 282 | 295 | 320 | 321 | 327 | 287 | 218 | 293 | 288 | 250 | 282 |
| Low dust emission: Number of particles (particles/l · 2 min) | 140 | 270 | 210 | 170 | 210 | 100 | 160 | 1800 | 2900 | 100 | 1600 |
| Low rolling characteristics | | | | | | | | | | | |
| Rolling - resistance (N) | 3.1 | 2.3 | 1.8 | 2.5 | 2.0 | 7.0 | 8.0 | 3.2 | 2.8 | 4.1 | 3.0 |
| Variation range of rolling - resistance (N) | 4.1 | 1.5 | 0.8 | 0.9 | 1.2 | 10.1 | 46.8 | 4.6 | 187.5 | 290.8 | 19.0 |
| Fretting resistance | | | | | | | | | | | |
| Assessment of generation of particles by oxidative abrasion | Δ | ○ | ◎ | Δ | ◎ | X | X | X | ◎ | X | ○ |
| Magnitude of abrasion (μm) | 4.0 | 2.6 | 2.3 | 4.2 | 2.1 | 3.8 | 6.6 | 5.4 | 0.6 | 5.8 | 2.8 |

(Note)
Assessment of generation of particles by oxidative abrasion
◎: None,
○: Slight,
Δ: Moderate,
X: Pronounced As is apparent from the results shown in Table 1 and FIGS. 2 to 4, the grease composition of low dust emission prepared in each Example performs with an excellent balance of low dust emission, low rolling characteristics, and fretting resistance.

What is claimed is:

1. Grease compositions comprising 10–35 mass % of (A) lithium stearate as thickener and 0.05–15.0 mass % of (B) diphenyl hydrogenphosphite and displaying a worked penetration in the range 270–350.

2. Grease compositions according to claim 1, wherein component (B) includes oxidized paraffins.

3. Bearings sealed with the grease compositions described in claim 1 or claim 2.

* * * * *

UNITED STATES PATENT AND TRADEMARK OFFICE
CERTIFICATE OF CORRECTION

PATENT NO.     : 6,339,049 B1                                             Page 1 of 1
DATED          : January 15, 2002
INVENTOR(S)    : Hiroshi Funahashi et al.

It is certified that error appears in the above-identified patent and that said Letters Patent is hereby corrected as shown below:

<u>Column 9,</u>
Line 8, change "0.05" to -- 0.5 --.

Signed and Sealed this

First Day of April, 2003

JAMES E. ROGAN
*Director of the United States Patent and Trademark Office*